Aug. 14, 1951 — R. AMSLER — 2,563,905
ELECTRICAL REGULATOR AND CONTROLLER
Filed May 21, 1946 — 2 Sheets-Sheet 1

INVENTOR
Robert Amsler
BY Morgan, Finnegan and Durham
ATTORNEYS

Aug. 14, 1951     R. AMSLER     2,563,905
ELECTRICAL REGULATOR AND CONTROLLER
Filed May 21, 1946     2 Sheets-Sheet 2

Patented Aug. 14, 1951

2,563,905

UNITED STATES PATENT OFFICE 2,563,905

ELECTRICAL REGULATOR AND CONTROLLER

Robert Amsler, Zug, Switzerland, assignor to Landis & Gyr, A. G., a body corporate of Switzerland Application May 21, 1946, Serial No. 671,151
In Switzerland May 28, 1945

6 Claims. (Cl. 318—29)

The present invention relates to electric regulating and controlling apparatus.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 1:
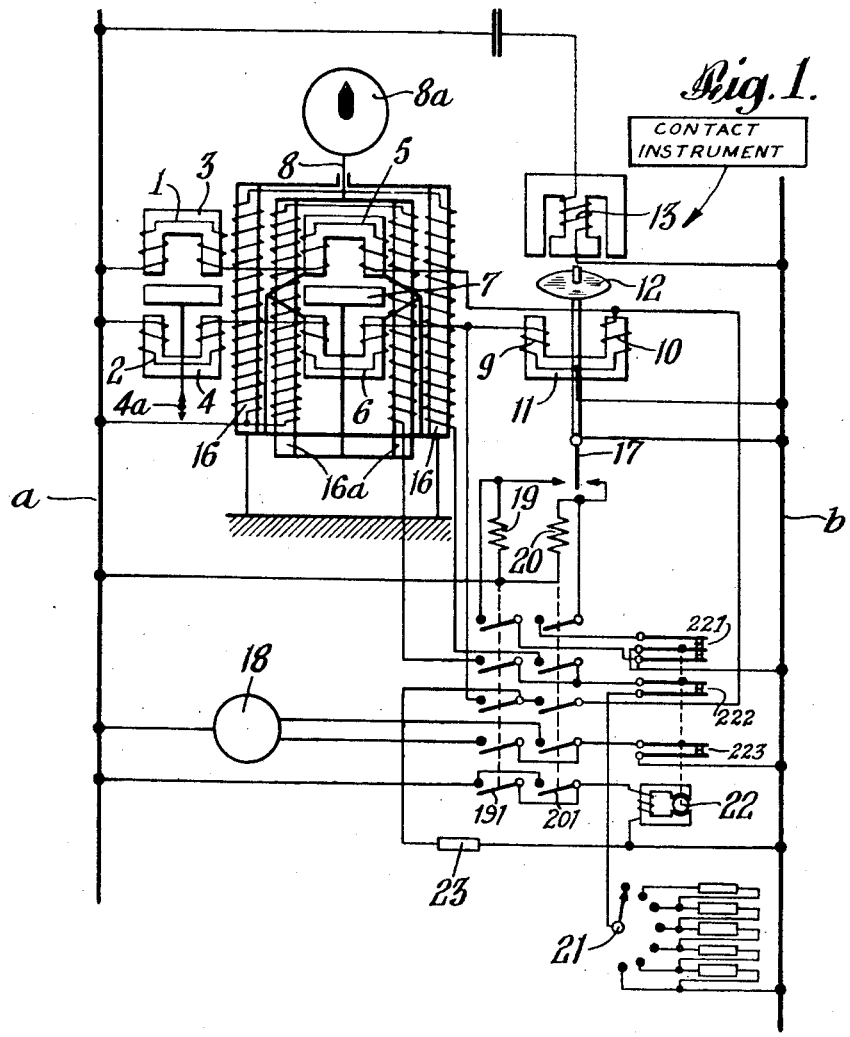
Figure 1 shows schematically the present preferred and illustrative embodiment of the invention including a progressive regulator with a flexible return circuit.

Electric regulators and controllers are known in which electrical resistances subject to the influence of temperature or other physical magnitudes, are utilized as essential components of the sensing devices. For improving the regulating properties of these regulators, return devices, especially of the electrothermal type, have already been used.

The two best known methods for subjecting electrical resistances to the influence of physical magnitudes are not altogether satisfactory. One of the two methods is based on a sliding contact influenced by physical magnitudes which thereby connects a smaller or greater portion of the resistance. Another principle makes use of electrical resistances, in which the change in temperature is directly utilized to modify the resistance.

The first-named method suffers from instability of the transition resistance, wear of the contacts and the necessity of using comparatively large forces for adjusting the contact. The second method, when normal contacts are used, is generally accompanied by a comparatively high rise of temperature in the measuring resistance, a result undesirable for technical reasons connected with measurement and regulating.

The present invention has for its object the provision of an improved regulating and controlling apparatus which is electrically actuated and transmits to a remote apparatus controlling and regulating measurements which are of non-ohmic character. A further object is the provision of an improved apparatus by which measurements of physical factors may influence and control the operation of apparatus, such as heating or air conditioning apparatus. Still another object is the provision of a control apparatus which requires no feelers, slidable contacts nor heat sensitive resistances for its control operation.

According to the invention, a combination of a feeler device adapted to react to any desired physical magnitude and elements which are at least partially not purely ohmic as a feeler transmitter arc used for transferring the original measured magnitudes into electrical impulses, and return devices are added to improve the regulating properties.

Other features of the invention will appear in the following description and the accompanying drawings, which latter illustrate typical embodiments and applications of a regulator and controller for regulating temperature in accordance with the invention.

Changes in inductance or capacity—i. e. the not purely ohmic elements—can be produced by the physical values, directly, for example by utilizing the sensitivity to temperature of the permeability of iron cores to modify inductances, or by utilizing the change of permeability in certain alloys, under the influence of mechanical stressing (magneto-striction effect), or the like. In the case of condensers, the temperature-sensitivity of the dielectric constants may be utilized. The regulation may be produced indirectly by allowing the physical magnitudes to act upon suitable intermediate members which, in turn— in accordance with physical magnitudes—generate forces which can influence air gaps in choking coils or condensers.

It will be understood that the foregoing general description and the following detailed description as well are exemplary and explanatory of the invention but are not restrictive thereof.

Referring now in detail to the illustrative embodiment of the invention as shown by the accompanying drawings, the fundamental circuit arrangements of the measurement system and its sensing device, transmitter and return, according to Figures 1 and 2, include the current coils 9 and 10 of a Ferraris watt-meter (acting as a contact control instrument for the movable contact 17 which alternatively contacts with fixed contacts shown) which are oppositely connected with reference to the voltage coil 13, so that when the current in coils 9 and 10 on core 11 is equal the torque of disc 12 is zero.

The sensing transmitter includes the windings 1 and 2 on cores 3 and 4 respectively. Setting transmitter 5 to 7 includes the winding 5 on its core in series with windings 1 and 10, while winding 6 on its core is in series with windings 2 and 9.

The sensing transmitter 1 to 4 and setting transmitter 5 to 7 are choke coils with adjustable air gaps, the gap in the setting transmitter being adjusted by screw means 8 having a knob 8a and that of the sensing transmitter by a sensitive element 4a which translates the measured magnitude into mechanical motion, for instance if element 4a is a thermally expansible member, a piezo-electric crystal or other sensitive element.

When the setting transmitter is set for a given air gap, then—assuming that the measured magnitudes were correct—the currents in the windings 9, 10 of the magnet 11 are unequal. Consequently, the watt-meter, acting through the driving disc 12, swings the regulator contact 17, controlling the regulator 18, operates to vary and correct the measured magnitudes. In this manner, the measured and changing magnitude modifies the air gap of the sensing transmitter by means of the sensitive element, until it has attained the same value as the setting transmitter. The currents in 9 and 10 are then equal and the regulator contact 17 is turned into the midway position to stop further action. Returns 16 and 16a will be explained later.

Figure 2:
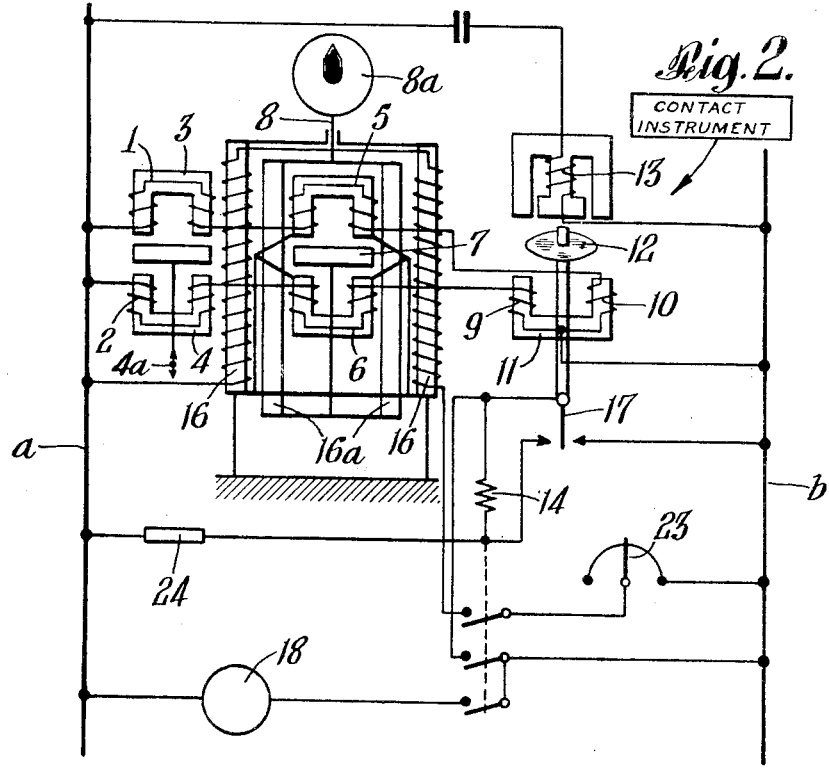
Figure 2 is a schematic circuit diagram of a modified embodiment of the invention using an on-off regulator and a fixed return.

Without going into detail, it may be mentioned that 14, 19 and 20 are relays, 21 is a variable resistance, 22 a tapping motor, 23 a return resistance and 24 a protective resistance. Tapping motor 22 actuates 221, 222, 223 through a mechanical connection indicated by the dotted line; to open and close switches 222 and 223 and to close and open the upper pair of contacts of switch 221, thereby transmitting pulses of current through these switches. Resistor 21 illustratively has six steps and an "off" position and is manually moved to adjust the return value of the circuit. In Figures 1 and 2, similar reference characters are used to designate similar parts.

Both the sensing transmitter 1, 2, 3, 4 and the setting transmitter 5, 6, 7, 8 adjust the regulator.

In addition, either the sensing transmitter, and if desired, the setting transmitter, can be directly influenced by the return components. Since for thermal effect the feeler transmitter should have a minimum of mass, and for electrical reasons, should have a minimum number of leads, the return device in the present example is connected with the setting transmitter.

Figure 3:
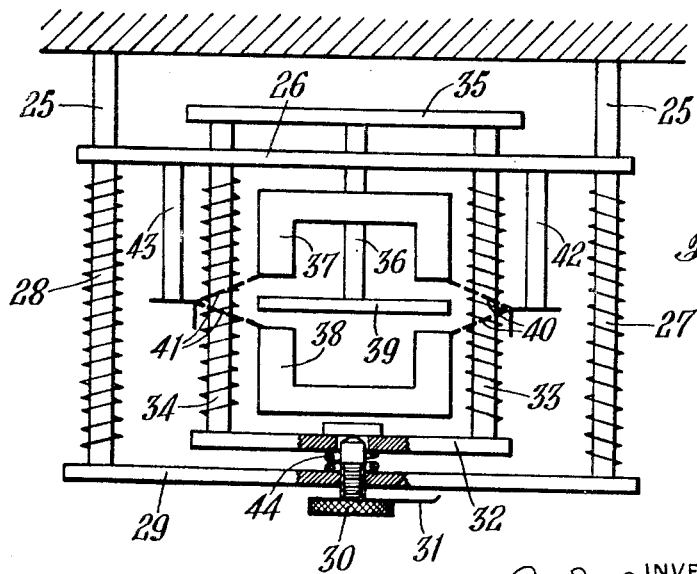
Figure 3 is a detailed schematic view showing a transmitter with a thermal return.

A typical embodiment of the return, in accordance with the present invention, acting on a thermal function, is shown in Figure 3 and will be described.

Mounted on a plate 26 and secured in a fixed position on pillars 25, are two brass tubes 27 and 28 connected together by means of a second plate 29 and provided with heating coils.

The setting member 30, with pointer 31, is mounted so as to be screwed in and out, the pointer moving over a scale on the plate 29. Also connected with the adjusting screw 30 is a plate 32, on which are secured two brass tubes 33 and 34 connected together by another plate 35 and provided with heating coils. Mounted on the plate 35, by means of a rod 36, is an armature 39, which coacts with a double choking coil 37, 38.

The double choking coil 37, 38 is fastened to the fixed plate 26 by means of a rigid holder 40, 41 and struts 42, 43. The struts 36, 42 and 43 are preferably made of Invar.

Interposed between the plates 29 and 32 is a compression spring 44 surrounding the adjusting screw 30 and eliminating any free play between the plates 29 and 32 and the members arranged thereon.

In the functioning of the above described arrangement:

Fundamentally, one of the return components (tubes 33, 34) is engaged between the adjusting screw 30 of the setting transmitter and the armature 39 displaceable by means of said screw. The other return component (tubes 27, 28), however, must be arranged between the adjusting screw 30 and the fixed base 25, 26.

Arranging the return members 33, 34 solely between the adjusting screw and the armature 39, could make the device sensitive to the temperature of the environment. To counteract this, the second system of return member 27, 28, is disposed between the fixed base 25, 26 and the adjusting screw 30. Compensation is thus afforded by the two return systems in opposition.

One of the simplest components serving as return member with a high coefficient of expansion is a brass tube, fitted with a heating coil.

If only one pair of tubes is heated, displacement occurs on the corresponding side; if, on the other hand, the other pair is heated, displacement will occur on that. In this manner any desired adjustment of the desired temperature in either direction may be imposed on the regulator, its value being determined by the output of heat.

Figure 4:
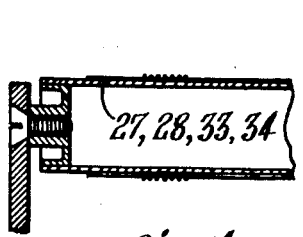
Figure 4 is a fragmentray sectional view of a regulating expansion tube having a small time constant.

Figure 4 shows, on a larger scale than in Figure 3 and in longitudinal section, one of the expansion tubes 27, 28, 33, 34 suitable for regulation with a small time constant.

Figure 5:
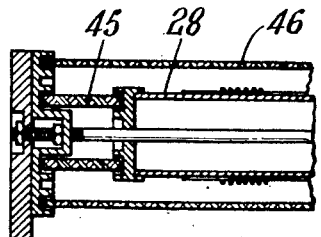
Figure 5 is a similar view of a regulator having a greater time constant.

The expansion tube according to Figure 5 is a modification, in which the rate of re-cooling is retarded by insulating the tube—for example 28—from the other frames, by means of glass tubes 45, 46, this being suitable for the regulation of objects with large time constants.

The following sets out the principles upon which the features of the return, in the case of the typical example of a progressive regulator (Figure 1) of the kind concerned, should be based, in order to ensure that the regulator will have the most favorable properties:

The function of the return is to stabilize the regulating operation. Instability in this respect is due to the inevitable reaction lag of the regulated object with the result that each regulating impulse is delayed for the extent of this time lag and over-regulation occurs. The return should simulate an actual value to the regulator, which is ahead of the effective actual value to an extent which is exactly equal to the reaction lag, so that the regulator comes into action at precisely the right moment and over-regulating is prevented.

The return member must readjust itself in accordance with the balancing of the actual value with the desired value, owing to the lag in the apparatus after the regulating member is brought to a standstill. Accordingly, the readjustment rate is co-ordinated with the rate of compensation of the apparatus.

The initial rate of change acting on the return member is subject to another condition, as it controls the duration of the shortest possible regulating impulse. The insensitive zone of the regulator should be as small as possible. This requires, however, that the duration of the shortest regulating impulse must be shorter than this zone; otherwise, the regulator would hunt or oscillate continuously. Thus the shorter the shortest regulating impulse, the higher will be the rate of adjustment of the regulating member and therefore the rapidity of the regulation.

Accordingly, means are provided for keeping the regulating impulse as short as possible. For this purpose the thermal return responds as rapidly as possible, and effects a measurable adjustment of the regulator. The duration of contact, that is, the length of the regulating impulse, accordingly depends solely on the time required for the response of the return, and can be considerably shortened by increasing the heat output of the thermal return. In order to obtain this without objectionable overheating, which would cause an unnecessarily high temperature of the return member, the supply of current to the heating coil, instead of continuing through the full duration of the regulating impulse, is restricted to merely a fraction of that period—for example, one-third on and two-thirds off—so that the heat output can be increased three-fold for the same heating effect and return value.

Other means must also be provided in the case of a regulator with a very small insensitive zone. The heating of the thermal return and the latter itself, also have a reaction lag, the result of which is, first of all, that the impulse continues at least as long as the lag, and after the impulse has ceased, a further increase in the return member takes place during the period of the lag. The first of these makes the shortest regulating impulse at least as long as the reaction lag of the return; the second causes the contact of the watt-meter of the regulator to continue to travel during the reaction period of the return after the impulse has ceased, thus causing the contact to be made on the opposite side and thereby causing the regulator to oscillate.

This effect can be prevented by interpolating in the circuit the second return, which functions without lag, illustratively, by tuning (damping) the watt-meter 18—13 by a resistance 23 (Figure 1). In this way, the regulating impulse is considerably shortened, since the contact 17 breaks away at once. By the time the thermal return has responded to the impulse, the latter has already ceased. The setting back of the watt-meter after the cycle of the automatic tapper 22 has been completed, proceeds at a relatively slow rate, due to its damping, so that, in the meantime, the thermal return has developed a measurable value before the contact again comes into action. If the regulated values have not changed, the next impulse takes place only after the reconstitution of the thermal return value has terminated.

While one of the two relays 19 or 20 is being excited the automatic impulse sending motor 22 is cut in simultaneously by means of the contact 191 or 201, which, after a variable time, actuates the switches 221, 222 and 223. Motor 22 operates so that the holding current circuit of the excited relay 19 (or 20) is interrupted by the actuation of the switch 221, and the holding circuit of the relay 20 (or 19) is reset. Furthermore, the two circuits of the regulating member 18 and the two heat windings of the return arrangements 16 and 16a are each time separated from the network, while they are being cut in again by means of the contacts of the relay 19 or 20 when one of them is excited by the regulating contact 17.

By means of these measures, the duration of the shortest regulating impulse can be reduced to a fraction.

The damping of the watt-meter—hereinafter termed the electric return—has the additional effect of steadying the regulator over a range corresponding to twice the return value of the electric return.

Consequently the relation between the duration of the regulating impulse and the period consisting of impulse plus pause, depends on the extent to which the effect value (plus return value of the thermal return) differs from the desired value. If this difference is equal to the value of the electric return, permanent contact results.

Within this range, therefore, any deviation from the desired value is co-ordinated with a different mean rate of adjustment.

The joint use of the quick-acting electric return, and the sluggish thermal return yields a steady regulation with flexible return, and without any permanent variability; that is to say, with constant desired value under any loading of the regulated object.

The described combination has the further effect that the rate of regulation can be considerably increased compared to the use of either only the thermal, or only the electric return producing a steady effect.

In the example of the on-and-off regulator shown in Figure 2, with rigid return, only the pair of tubes 16 of the return member are heated.

Instead of the thermal and electric return, electromagnetic, or other returns, may be used within the scope of the invention.

In addition to the regulating devices specified, use may also be made within the scope of the invention, of such as consist, for example, of at least one heated bi-metallic tube in operative connection with at least one supplementary voltage-booster.

In association with not purely ohmic elements as transmitter for translating the original measurement values into electric measurements, condensers combined with the corresponding return devices, may also be used.

As already mentioned, in a general manner, arrangements in which at least one return device is incorporated either with the feeler, the feeler transmitter, the setting transmitter or the measurement means, also come within the invention.

The invention in its broader aspects is not limited to the specific mechanisms shown and described but departures may be made therefrom within the scope of the accompanying claims without departing from the principles of the invention and without sacrificing its chief advantages.

What is claimed is:

1. In an electric regulator a pair of opposed choke coils, a movable magnetic piece between said coils, a base on which choke coils are supported, oppositely acting thermally expansible members supporting said magnetic piece and separate heating means for said expansible members.

2. In an electric regulator according to claim 1, means for adjustably moving one expansible member relative to the other to vary the position of the magnetic piece independently of temperature.

3. In an electric regulator a pair of opposed choke coils, a movable magnetic piece between said coils, a base on which choke coils are supported, oppositely acting members moved by changes in magnitude in a physical quantity supporting said magnetic piece and separate heating means for said expansible members.

4. In an electric regulator according to claim 3, means for adjustably moving one expansible member relative to the other to vary the position of the magnetic piece independently of temperature.

5. In an electric regulator and controller having a source of alternating current power, the combination comprising, a sensing element responsive to a physical factor for measuring the magnitude of said factor, an electromechanical device operatively coupled to said sensing element to transmit the magnitude of said physical factor, a second electromechanical device electrically coupled to said first device and having adjustable means for providing a predetermined standard of operation of the regulated subject to which the magnitude of the physical factor can be compared, contact control means electrically coupling said electromechanical device to the regulator to initiate the regulator in response to said comparison, and thereby return the regulated subject to the predetermined standard of operation, a thermoelectric return signal means operatively associated with one of said electromechanical devices to stabilize the action of said device within the reaction time of the regulated subject in response to the magnitude of the principal factor, and controlled circuit means electrically coupling said thermoelectric signal return in the regulatory circuit through said control means.

6. A regulator and controller according to claim 5 which includes an electrical return signal means to stabilize the action of said control means within the reaction time of the thermoelectric signal return, said electrical return signal means comprising an electrical impedance electrically connected in circuit with said control means concurrently with said thermoelectric signal return to dampen said control action in response to the physical factor being measured.

ROBERT AMSLER.

REFERENCES CITED

The following references are of record in the file of this patent:

UNITED STATES PATENTS

| Number | Name | Date |
|---|---|---|
| 2,010,554 | Melas | Aug. 6, 1935 |
| 2,079,497 | Wilhjelm | May 4, 1937 |
| 2,208,760 | Hartig | July 23, 1940 |
| 2,276,506 | Moore | Mar. 17, 1942 |
| 2,320,881 | Newton | June 1, 1943 |
| 2,353,691 | Clingman | July 18, 1944 |
| 2,376,598 | Jones | May 22, 1945 |
| 2,414,314 | Machlet | Jan. 14, 1947 |

FOREIGN PATENTS

| Number | Country | Date |
|---|---|---|
| 444,673 | Great Britain | Mar. 25, 1936 |